US009774757B2

(12) United States Patent
Seetharaman et al.

(10) Patent No.: US 9,774,757 B2
(45) Date of Patent: Sep. 26, 2017

(54) METHODS AND SYSTEMS FOR INCREASING QUALITY AND RELIABILITY OF FAX COMMUNICATIONS

(71) Applicant: Wipro Limited, Bangalore (IN)

(72) Inventors: Swaminathan Seetharaman, Chennai (IN); Kumar Ramadoss, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/045,989

(22) Filed: Feb. 17, 2016

(65) Prior Publication Data
US 2017/0195517 A1    Jul. 6, 2017

(30) Foreign Application Priority Data

Dec. 30, 2015  (IN) ............................ 7091/CHE/2015

(51) Int. Cl.
| G06F 11/00 | (2006.01) |
| H04J 1/16 | (2006.01) |
| H04L 12/26 | (2006.01) |
| H04L 12/833 | (2013.01) |
| H04N 1/333 | (2006.01) |
| H04N 1/00 | (2006.01) |

(52) U.S. Cl.
CPC ............. H04N 1/333 (2013.01); H04N 1/001 (2013.01); H04N 1/0001 (2013.01); H04N 1/00029 (2013.01); H04N 1/00087 (2013.01); H04N 1/00217 (2013.01); H04L 43/0829 (2013.01); H04N 2201/0093 (2013.01); H04N 2201/33307 (2013.01)

(58) Field of Classification Search
USPC ...... 358/1.13, 1.15; 370/235, 241, 242, 341, 370/229, 237
See application file for complete search history.

(56) References Cited

U.S. PATENT DOCUMENTS 5,363,376 A * 11/1994 Chuang ................ H04B 7/2696
                                                        370/332
2004/0042467 A1 * 3/2004 Abrishami ......... H04N 1/32614
                                                        370/401

(Continued)

Primary Examiner — Benny Q Tieu
Assistant Examiner — Juan M Guillermety
(74) Attorney, Agent, or Firm — LeClairRyan, a Professional Corporation (57) ABSTRACT

This disclosure relates generally to fax communication and more particularly to methods and systems for increasing quality and reliability of fax communications. In one embodiment, a method of communicating fax in a communication network is provided. The method includes diagnosing in real-time, by at least one network device, network parameters, availability of network resources, and technical capabilities of network devices involved in communicating fax; modifying dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication; and iteratively adapting, by the at least one network device, dynamic modification of the fax mode, based on historic fax mode modification and historic diagnosis data.

18 Claims, 7 Drawing Sheets

(56) References Cited

U.S. PATENT DOCUMENTS

| | | | | |
|---|---|---|---|---|
| 2005/0089042 A1* | 4/2005 | Ruutu | .................... | H04L 47/11 |
| | | | | 370/395.21 |
| 2010/0113037 A1* | 5/2010 | Ong | .................. | H04L 12/5695 |
| | | | | 455/445 |
| 2010/0309781 A1* | 12/2010 | Wang | .................. | H04B 7/0871 |
| | | | | 370/229 |
| 2012/0026882 A1* | 2/2012 | Park | ..................... | H04W 28/24 |
| | | | | 370/235 |
| 2013/0107706 A1* | 5/2013 | Raleigh | ............ | H04W 28/0268 |
| | | | | 370/230 |
| 2013/0114407 A1* | 5/2013 | Liu | .................. | H04W 28/0289 |
| | | | | 370/230 |
| 2013/0271782 A1* | 10/2013 | Ashmore | ........... | H04N 1/33369 |
| | | | | 358/1.14 |
| 2014/0050101 A1* | 2/2014 | Ulybin | ............... | H04L 41/5038 |
| | | | | 370/242 |
| 2016/0308769 A1* | 10/2016 | VerSteeg | ................ | H04L 47/12 |

* cited by examiner

METHODS AND SYSTEMS FOR INCREASING QUALITY AND RELIABILITY OF FAX COMMUNICATIONS

This application claims the benefit of Indian Patent Application Serial No. 7091/CHE/2015 filed Dec. 30, 2015, which is hereby incorporated by reference in its entirety.

TECHNICAL FIELD

This disclosure relates generally to fax communications and more particularly to methods and systems for increasing quality and reliability of fax communications.

BACKGROUND

In current Next Generation Networks (NGN) or Internet Protocol (IP) networks, fax can be transmitted in different formats, for example, using T.38 mechanism or simply over voice codecs, such as, G.711. However, the sender side fax device, the receiving side fax device, the sending network, and the receiving network have to agree beforehand on the fax mode that would be used for fax transmission. Only after the mode for fax transmission has been agreed upon, the fax is transmitted from the sender side fax device to the receiver side fax device.

As only that fax mode, which is supported by both the sender side fax device and the receiver side fax device, can be used for the fax transmission, if one of the fax devices only supports fax mode of a lower quality, the fax will be transmitted using lower quality mode only. This lower quality may be further degraded in case of lossy links or networks, or under adverse network conditions. As a consequence, the quality of fax received by the receiver side fax device is much worse than what was originally transmitted from the sender side fax device.

SUMMARY

In one embodiment, a method of communicating fax in a communication network is disclosed. The method includes diagnosing in real-time, by at least one network device, network parameters, availability of network resources, and technical capabilities of network devices involved in communicating fax; modifying dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication; and iteratively adapting, by the at least one network device, dynamic modification of the fax mode, based on historic fax mode modification and historic diagnosis data.

In another embodiment, a system for communicating fax in a communication network is disclosed. The system includes at least one processor and a computer-readable medium. The computer-readable medium stores instructions that, when executed by the at least one processor, cause the at least one processor to perform operations that include diagnosing in real-time, by at least one network device, network parameters, availability of network resources, and technical capabilities of network devices involved in communicating fax; modifying dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication; and iteratively adapting, by the at least one network device, dynamic modification of the fax mode, based on historic fax mode modification and historic diagnosis data.

In yet another embodiment, a non-transitory computer-readable storage medium for communicating fax in a communication network is disclosed, which when executed by a computing device, cause the computing device to: diagnose in real-time, by at least one network device, network parameters, availability of network resources, and technical capabilities of network devices involved in communicating fax; modify dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication; and iteratively adapt, by the at least one network device, dynamic modification of the fax mode, based on historic fax mode modification and historic diagnosis data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
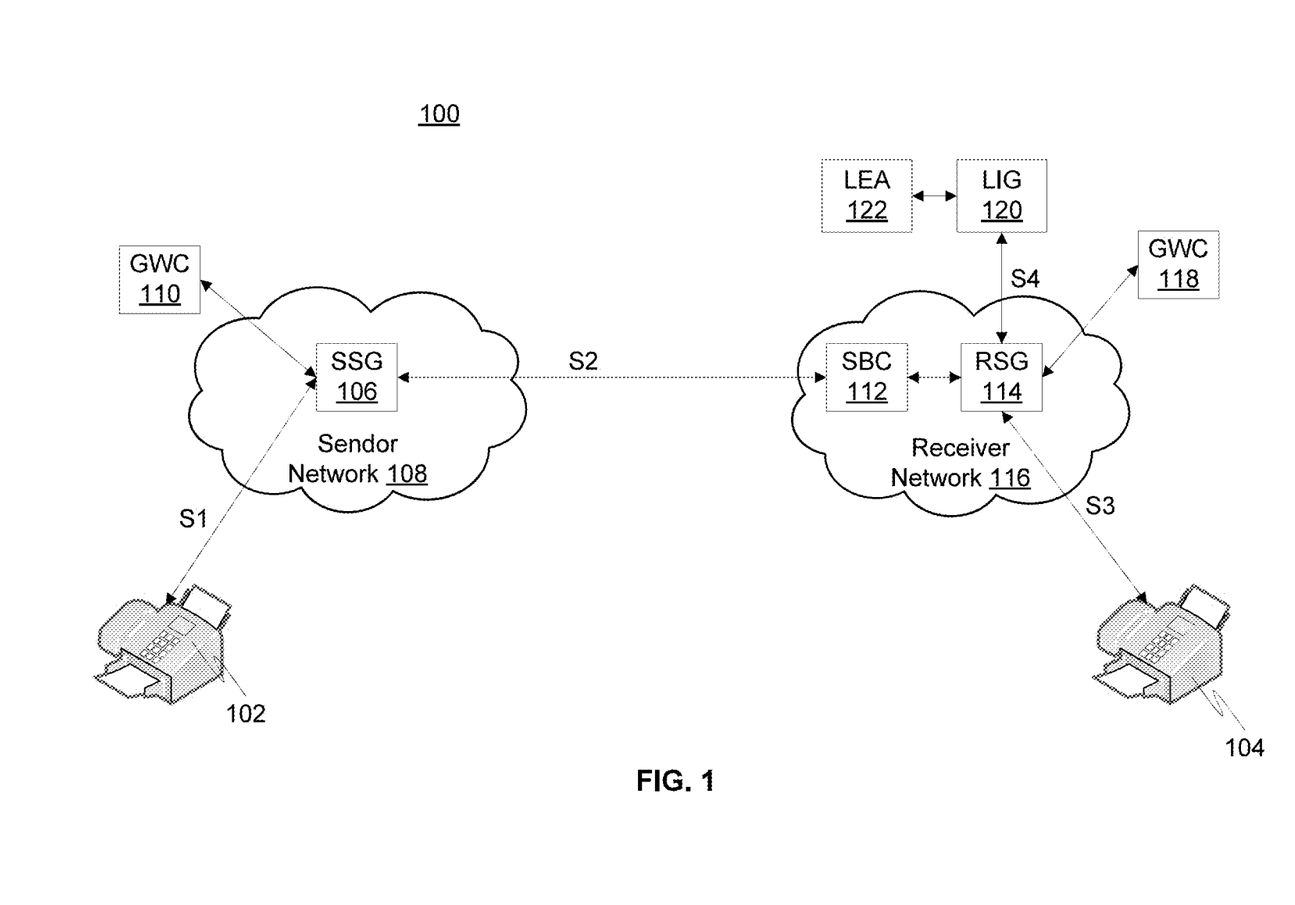
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a sender side fax device 102 that initiates a fax communication session, which includes fax packets, with a receiver side fax device 104. To this end, sender side fax device 102 first transmits the fax packets to a Sender Side Gateway (SSG) 106 in a sender network 108 through a network segment S1. SSG 106 may be a media gateway. Functioning of SSG 106 is controlled and managed by a Gateway Controller (GWC) 110.

GWC 110 then instructs SSG 106 to forward the fax packets to a Session Border Controller (SBC) 112 over a network segment S2. SBC 112 performs various functions, which may include, but are not limited to topology hiding, screening and manipulation of signaling content leaving/entering a network for security and policy purposes, controlling the traffic flowing out of or into the network. SBC 112 then forwards the fax packets to a Receiver Side Gateway (RSG) 114 in a receiver network 116. RSG 114 may be a media gateway. Functioning of RSG 114 is controlled and managed by a GWC 118. GWC 118 then instructs RSG 114 to forward the fax packets to receiver side fax device 104 over a network segment S3.

Receiver side fax device 104 is also identified for lawful interception. As a result, each communication session that involves receiver side fax device 104 is also forwarded to a Lawful Interception Gateway (LIG) 120. In this scenario, RSG 114 may include functionality of content duplication and may forward all fax packets destined for receiver side fax device 104 to LIG 120. LIG 120 further sends these fax packets to LEA 122.

Figure 2:
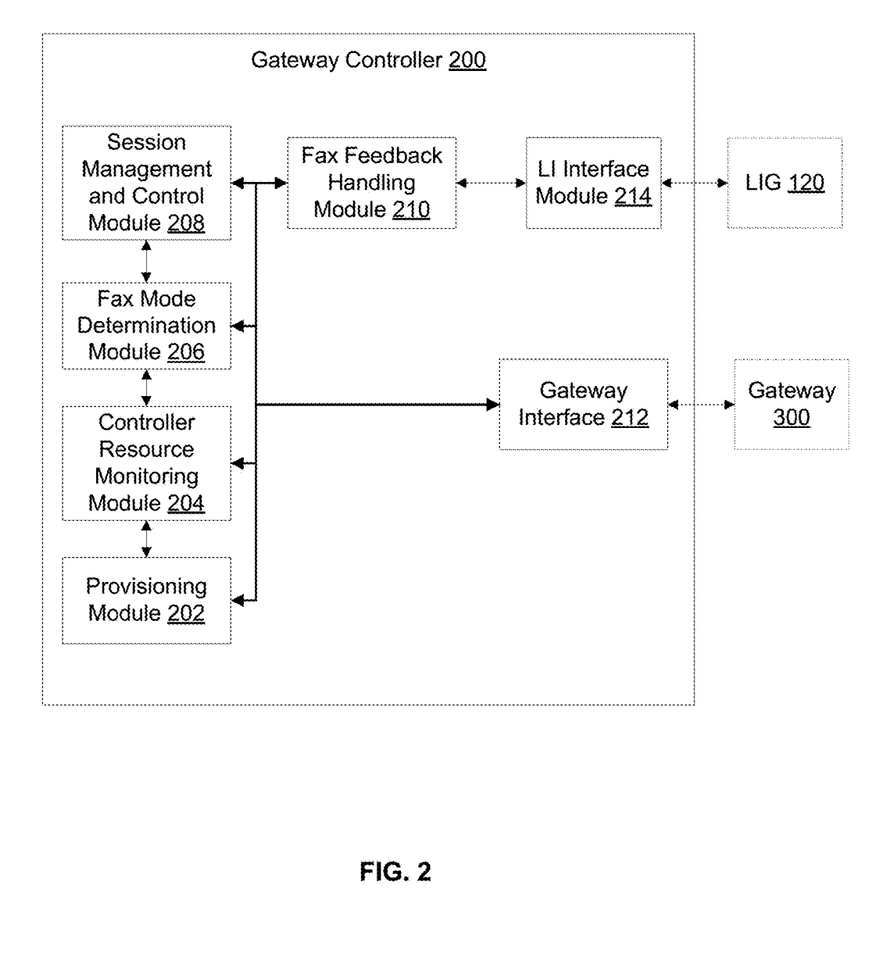
FIG. 2 is a block diagram illustrating various modules of a gateway controller that controls functioning of a gateway in a communication network, in accordance with an embodiment.

Referring now to FIG. 2, a block diagram of various modules within a gateway controller 200 that controls functioning of a gateway in a communication network is illustrated, in accordance with an embodiment. Gateway controller 200 represents each of gateway controller 110 and gateway controller 118. Gateway controller 200 includes a provisioning module 202, a controller resource monitoring module 204, a fax-mode determination module 206, a session management and control module 208, and a fax feedback handling module 210.

Provisioning module 202 provisions a plurality of thresholds. Each threshold is associated with one of the network parameters and fax quality. The network parameters may include, but are not limited to network congestion, CPU and memory occupancy levels in SSG 112 and RSG 114, packet queueing, buffer overflows, network delays, packet drops, and erroneous packets. Further, thresholds associated with fax quality is selected from a group comprising number of fax packets missing per second, number of fax packets dropped per second, and number of fax packets corrupted per second. Additionally, provisioning module 202 provisions network topology related information. This is further explained in detail in conjunction with FIG. 4. Controller resource monitoring module 204, in real time, diagnoses network parameters, availability of network resources, and technical capabilities of network devices involved in communicating fax. This is further explained in detail in conjunction with FIG. 5.

Based on the result of the diagnosis, fax mode determination module 206 dynamically modifies a fax mode to one of a set of pre-set fax modes. Each of the set of pre-set fax modes corresponds to a quality of fax communication. Modifying the fax mode by fax mode determination module 206 is further explained in detail in conjunction with FIG. 6. Session management and control module 208 triggers fax mode determination module 206 to determine fax mode for transmission and transcoding points. Thereafter, session management and control module 208 adapts signaling messages for setting up the fax session accordingly. Functionality of session management and control module 208 is further explained in detail in conjunction with FIG. 5 and FIG. 6.

Thereafter, fax feedback handling module 210 collects feedback about the fax quality from SSG 106, RSG 114, and from LIG 120. Based on collected feedback, fax feedback handling module 210 adapts thresholds accordingly for future use. Thereafter, it provides the adapted threshold values upon request to fax mode determination module 206 and session management and control module 208. This is further explained in detail in conjunction with FIG. 4. The communication of each module in gateway controller 200 with a gateway 300 (SSG 106 or RSG 114) is facilitated by a gateway interface 212. Additionally, an LI interface module 214 facilitates communication of gateway controller 200 with LIG 120.

Figure 3:
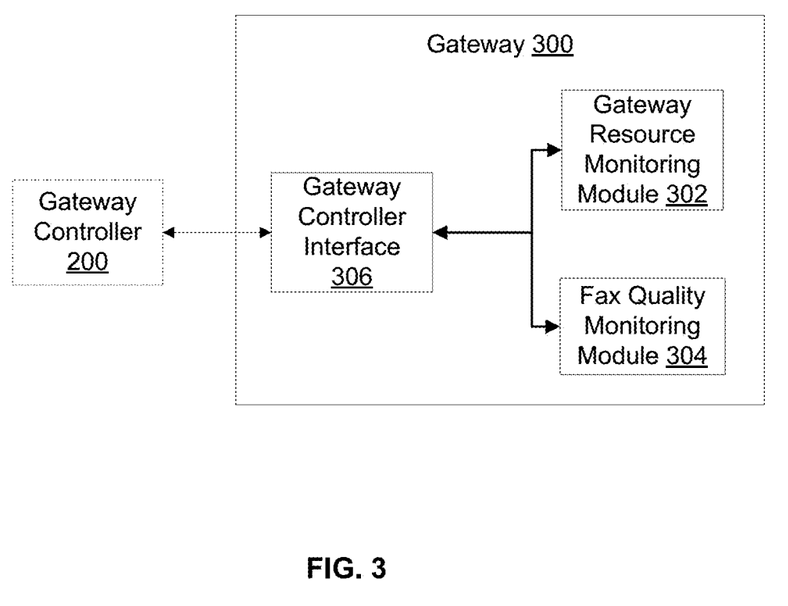
FIG. 3 is a block diagram illustrating various modules within a gateway that facilitate fax communication in a communication network, in accordance with an embodiment.

Referring now to FIG. 3, a block diagram of various modules within a gateway 300 that facilitate fax communication in a communication network is illustrated, in accordance with an embodiment. Gateway 300 may be a media gateway and may be SSG 106 or RSG 114. Gateway 300 includes a gateway resource monitoring module 302, a fax quality monitoring module 304, and a gateway controller interface 306.

Gateway resource monitoring module 302 collects information in real-time about the current occupancy levels of the resources (for example, CPU, memory, etc) in gateway 300 and congestion levels in the network segment connecting gateway 300 to other network nodes. Gateway resource monitoring module 302 then sends such information to gateway controller 200 through gateway controller interface 306 either periodically or when provisioned thresholds are crossed. Functionality of gateway resource monitoring module 302 is further explained in conjunction with FIGS. 4 and 5.

Fax quality monitoring module 304 monitors the fax quality, for example, number of fax packets missing/dropped per second, number of fax packets that were received corrupted per second. When the fax quality crosses the thresholds provisioned by provisioning module 200, fax quality monitoring module 304 sends relevant information to fax-mode determination module 206 in gateway controller 200. Functionality of fax quality monitoring module 304 is further explained in conjunction with FIGS. 4 and 5. Gateway controller interface 306 facilitates communication of various modules in gateway 300 with gateway controller 200.

Figure 4:
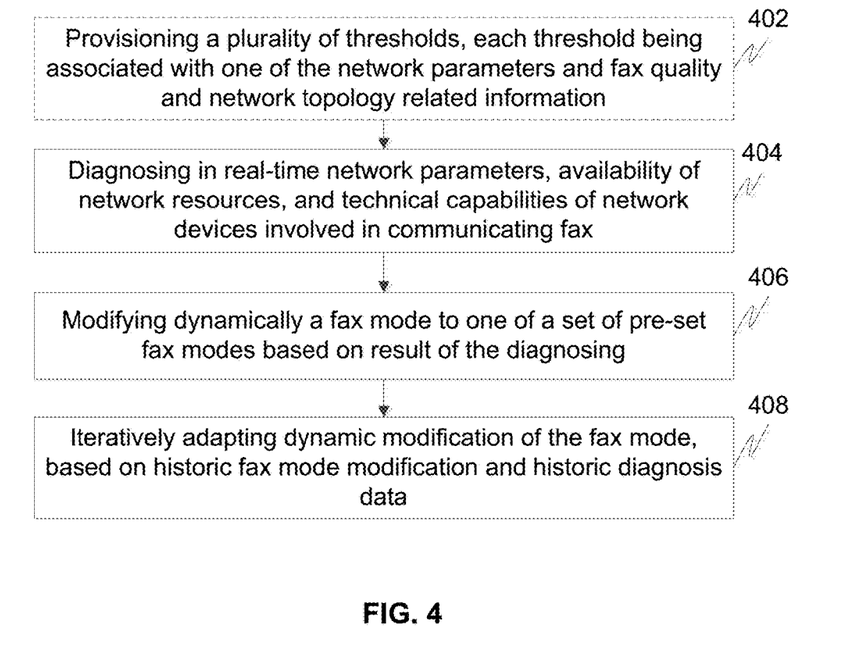
FIG. 4 illustrates a flow chart of a method of communicating fax in a communication network, in accordance with an embodiment.

Referring now to FIG. 4, a flow chart of a method of communicating fax in a communication network is illustrated, in accordance with an embodiment. When the system communication is initiated, provisioning module 202 provisions a plurality of thresholds at 402. The provisioned threshold may be associated with the fax quality. A threshold associated with fax quality may include, but is not limited to number of fax packets missing per second, number of fax packets dropped per second, and number of fax packets corrupted per second.

Additionally, the provisioned thresholds may be associated with network parameters. Network parameters may include, but are not limited to network congestion, CPU and memory occupancy levels in SSG 112 and RSG 114, packet queueing, buffer overflows, network delays, packet drops, and erroneous packets. For example, thresholds associated with network congestion and load levels on gateways in the communication network are provisioned based on technical capabilities of remote user and/or peer networks, when a higher quality fax transmission mode (for example, T.38) is to be used. By way of another example, similar thresholds may be provisioned for RSG 114 connecting receiver network 116 to LIG 120 when a higher quality fax transmission mode is to be used. In this scenario, LEA 122 may provision that the highest quality fax mode must be used from a gateway to LIG 120.

Additionally, at 402, provisioning module 202 also provisions network topology related information. Network topology information may include, but is not limited to interconnecting routes and their physical distances between networks, position and distance of MGWs, access gateways, SBCs. These provisioned thresholds and network topology information are then shared with SSG 106 and RSG 114.

Thereafter, at 404, resource monitoring module 204, in real time, performs a diagnosis on network parameters, availability of network resources, and technical capabilities of network devices involved in communicating fax. The result of diagnosis on the network parameters may include, but is not limited to congestion levels in various network segments in the communication network and load levels in the gateways of the communication network, missing packets, packet delays, buffer overflows. Similarly, the result of diagnosis on the available network resources may include, but is not limited to available bandwidth. Further, the result of diagnosis on the technical capabilities of the network devices may include, but is not limited to fax transmission and reception capability of the fax devices and gateways involved in communication of the fax. This is further explained in detail in conjunction with FIG. 5.

At 406, fax mode determination module 206 dynamically modifies a fax mode to one of a set of pre-set fax modes based on the result of diagnosing the network parameters, availability of the network resources, and the technical capabilities of the network devices. In other words, based on the result of the diagnosis, fax-mode determination module 206 may select one of the pre-set fax modes which best suits the existing condition of the network parameters, current availability of the network resources, and/or existing technical capabilities of the network devices. The set of pre-set fax modes, for example, may include a fax mode A, a fax mode B, and a fax mode C. Each pre-set fax mode corresponds to a quality of fax communication. For example, fax mode A may be associated with the highest quality of fax, the fax mode B may be associated with the medium quality of fax, and the fax mode C may be associated with the lowest quality of fax. Examples of different qualities of fax communication may include, but are not limited to T.38 format (high quality) and voice codecs (for example, G.711), different modems (e.g., V.17, V.34), use of Error Control Mode (ECM), and different levels of redundancy (e.g., maximum redundancy, no redundancy).

Thus, for example, sender side fax device 102 may have a technical capability to transmit fax using the fax mode A and receiver side fax device 104 may have a technical capability of receiving the fax in the fax mode B. However, sender side fax device 102 may still transmit fax using the fax mode A due to congestion in the network segment S1 connecting sender side fax device 102 with SSG 106. Thus, though the quality of fax communication received at SSG 106 may deteriorate, it may not be as bad as the fax quality that would have been received under the fax mode B. SSG 106, for example, may receive the fax in a quality lower than that guaranteed under the fax mode A but higher than the fax mode B. Further, the network segments between SSG 106, SBC 112, and RSG 114 may be relatively congestion free. Based on availability of this information, SSG 106 may dynamically modify the fax mode A to the fax mode B. In other words, SSG 106 may transcode the fax mode A to the fax mode B. For example, if the fax mode A is T.38, SSG 106 may transcode it to the lower quality fax mode, i.e., G.711, as the loss in the network would be minimal due to the prevailing network conditions. The dynamic modification of the fax mode to one of a set of pre-set fax modes is further explained in detail in conjunction with FIG. 6.

Thereafter, at 408, fax feedback handling module 210 iteratively adapts the dynamic modification of the fax mode based on historic fax mode modification and historic diagnosis data. In other words, based on result of past diagnosis and scenarios in which fax modes were modified during past instances of fax communications, fax feedback handling module 210 learns and refines the way the fax mode is dynamically modified for more efficient fax communication.

In an embodiment, at end of a fax communication session, SSG 106 and RSG 114, send a detailed report that includes data on fax quality retrieved from an associated fax quality monitoring module 304 and data on network conditions retrieved from gateway resource monitoring module 302 to an associated gateway controller. For example, SSG 106 sends the detailed report to gateway controller 110 and RSG 114 sends the detailed report to gateway controller 118. This detailed report is received by fax feedback handling module 210 in an associated gateway controller. Additionally, fax feedback handling module 210 in a gateway controller receives feedback about fax quality from fax feedback handling module 210 in gateway controller on the remote side. For example, fax feedback handling module 210 in gateway controller 118 receives feedback about fax quality from gateway controller 110.

With regards to network conditions, fax feedback handling module 210 receives detailed information from controller resource monitoring module 204 in gateway controller on the remote side. In other words, gateway controller 110 and gateway controller 118 share data on fax quality and network conditions with each other. Fax feedback handling module 210 may also requests fax quality information from LIG 120 through LI interface module 214.

Thereafter, fax feedback handling module 210 uses the information collected about fax quality and network conditions to determine the correlation between fax quality and network conditions. Based on the correlation, fax feedback handling module 210 adapts the plurality of thresholds associated with various network parameters (for example, network congestion level and/or load level on gateways). For example, if the fax quality drops below the threshold started from a network segment congestion threshold of 48%, when the fax transmission was being done over G.711, then a particular congestion level's lower threshold may be modified using equation 1 given below:

Adapted congestion level lower threshold = (1)

Current congestion level lower threshold * Modification Factor (MF)

where,

MF=Maximum {% of quality drop below the threshold, 5%}

The adapted thresholds are then used for subsequent fax sessions in future. Fax mode determination module 206 also collects information about duration of the current fax session and uses it to compute average duration of the fax session involving the fax sender and/or recipient. This information is used in determining the need for adapting fax mode of transmission for an ongoing fax session.

In the above described method, appropriate fax-mode for best quality fax transfer is dynamically selected based on capabilities of the involved parties (for example, sender side fax device, receiver side fax device, and media gateways) and based on dynamic network conditions without causing unnecessary overhead on availability of network resources. Moreover, the gateway controllers monitor network conditions and fax transmission quality in real time to detect any degradation. Based on this, the gateway controller determines if there is need to change the fax mode for transmission and then dynamically changes to appropriate fax mode. Additionally, gateway controller, while determining the appropriate fax mode for transmission, takes into account transmission bandwidth and processing resources of the gateways. As a result, the network resource usage is optimized for the selected mode of fax transmission while maintaining the desired fax quality. Finally, the system adapts over time based on past experience, thereby, improving its accuracy by auto-tuning.

Figure 5:
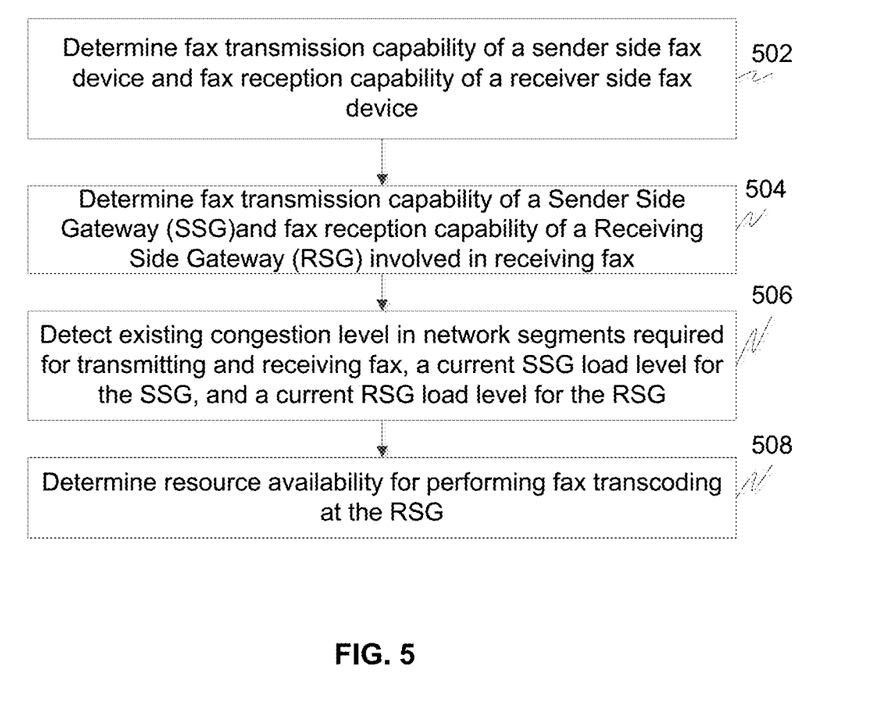
FIG. 5 illustrates a flow chart of a method of diagnosing network parameters, availability of network resources, and technical capabilities of network devices involved in communicating fax, in accordance with an embodiment.

Referring now to FIG. 5, a flow chart of a method of diagnosing network parameters, availability of network resources, and technical capabilities of network devices involved in communicating fax is illustrated, in accordance with an embodiment. At 502, fax transmission capability of sender side fax device 102 and fax reception capability of receiver side fax device 104 are determined. Before initiating the fax transmission, sender side fax device 102 sends a fax session setup request to receiver side fax device 104. The fax initiation request includes data about the fax modes which sender side fax device 102 is capable of using. In response to the fax session set up request, session management and control module 208 in gateway controller 118 performs necessary actions for setting up the fax call. These actions may include, but are not limited to reserving resources in RSG 114, sending a fax initiation request to receiver side fax device 104, and getting a response from receiver side fax device 104 that includes information about the fax modes which it is capable of using. The greatest common factor of these fax modes is then used as the fax mode for transmitting fax from sender side fax device 102. For example, sender side fax device 102 is capable of using the fax mode A and the fax mode B. However, receiver side fax device 104 is capable of using the fax mode B and the fax mode C only. Thus, in this case, sender side fax device 102 may use the fax mode B to transmit the fax, as receiver side fax device 104 is not capable of using the higher quality fax mode B. However, based on the claimed method, sender side fax device 102 may still use the fax mode A for transmitting the fax based on the network congestion information for network segments in the communication network. Additionally, upon receiving the fax session setup request, session management and control module 208 in gateway controller 118 initiates LI, as receiving side fax device 104 is an LI target. Initiating LI may include selecting appropriate Content Duplication Element (CDE).

Thereafter, at 504, fax transmission capability of SSG 106 and fax reception capability of RSG 114 is determined. This information for SSG 106 is obtained by session management and control module 208 in gateway controller 110 and is then stored locally when SSG 106 registers with gateway controller 110. Similarly, information for RSG 114 is obtained by session management and control module 208 in gateway controller 118 and is then stored locally when RSG 114 registers with gateway controller 118. Before the fax communication is initiated, the information regarding fax transmission capability of SSG 106 is communicated to RSG 114 through gateway controller 118.

Further, at 506, existing congestion level in network segments required for transmitting and receiving fax are detected. These network segments include the network segment S1, S2, and S3. Additionally, at 506, current load levels for SSG 106 and RSG 114 are also determined. Information associated with congestion level in the network segments S1 and S2 along with the current load level in SSG 106 is collected by gateway controller 110. In an embodiment, gateway controller 110 collects this information from other soft-switches and nodes in the communication network. With regards to current congestion levels and the resource occupancy in SSG 106, gateway resource monitoring module 302 in SSG 106 sends this information to gateway controller 110 periodically or whenever thresholds associated with the network parameters are exceeded.

At 508, resource availability for performing fax transcoding at SSG 106 and RSG 114 is determined. Session management and control module 208 in gateway controller 110 obtains resource availability information for fax transcoding in SSG 106 from gateway resource monitoring module 302, which further communicates with other modules in SSG 106. Gateway resource monitoring module 302 then forwards this information to session management and control module 208 in gateway controller 110 via gateway controller interface 306 in SSG 106 and gateway interface 212 in gateway controller 110. In a similar manner, session management and control module 208 in gateway controller 118 obtains resource availability information for fax transcoding in RSG 114. Fax transcoding, for example, may include conversion of T.38 format to G.711 and vice versa. Similarly, fax transcoding may include conversion of V.17 to V.34 and vice versa.

Figure 6:
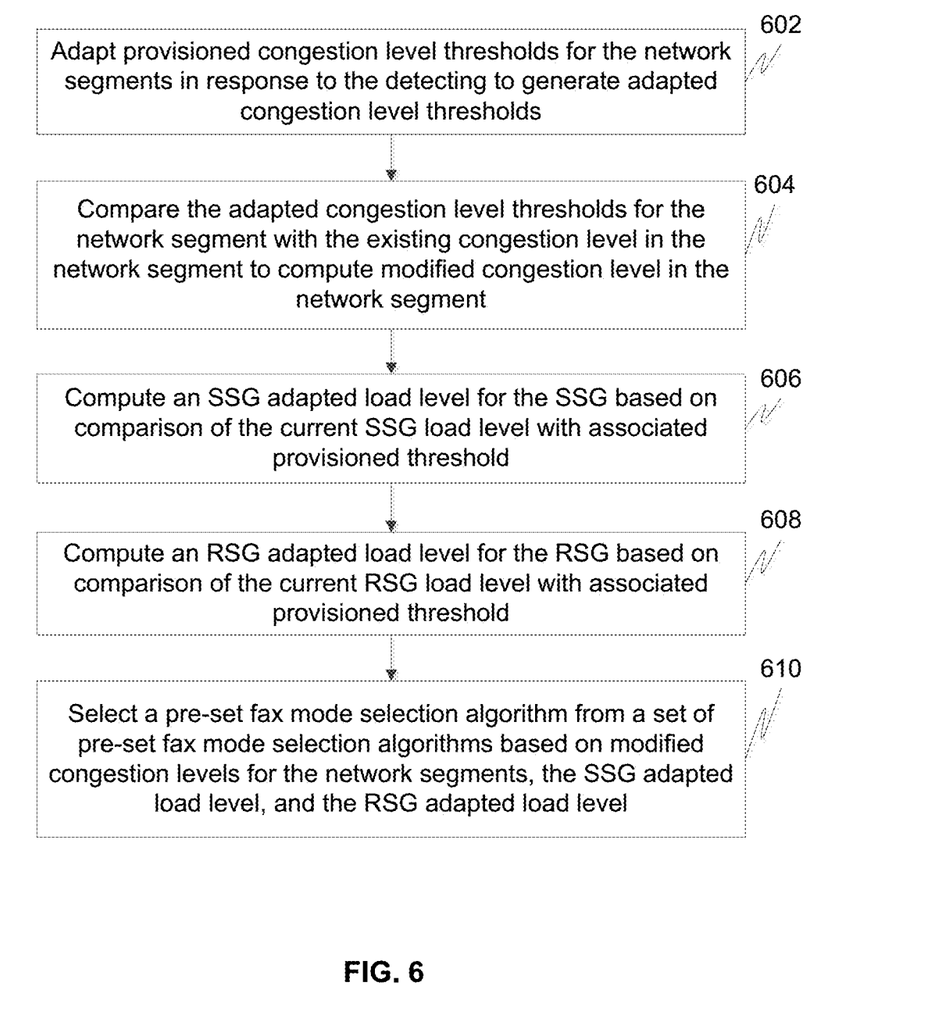
FIG. 6 illustrates a flowchart for dynamically modifying a fax mode to one of a set of pre-set fax modes in a communication network, in accordance with an embodiment.

Referring now to FIG. 6, a flowchart for dynamically modifying a fax mode to one of a set of pre-set fax modes in a communication network is illustrated, in accordance with an embodiment. Based on the current congestion level that have been detected in the network segments of the communication network, provisioned congestion level thresholds for the network segments are adapted to generate adapted congestion level thresholds at 602. Information regarding provisioned congestion level thresholds for the network segments is obtained from fax feedback handling module 210. This information is then passed to fax mode determination module 206, which then adapts the provisioned congestion level thresholds for the network segments based on their respective path lengths. The adapted congestion level thresholds values are then sent to session management and control module 208. These threshold values are used by fax mode determination module 206 in RSG 114 to determine the appropriate fax transmission mode. For example, for each of the network segment S1, S2, and S3, congestion level thresholds that have been provisioned during initiation of the system are adapted based on the current congestion levels in each of S1, S2, and S3.

In an embodiment, an adapted congestion level threshold for a network segment is a function of associated provisioned congestion level threshold, average distance between network devices at start and end of the network segments, and actual distance between network devices at start and end of the network segments. Fax mode determination module 206 in gateway controller 110 determines adapted congestion level thresholds for the network segments S1 and S2. In an exemplary embodiment, adapted congestion level threshold for the network segment S1 may be represented using equation 2 given below:

$$\text{Adapted congestion level threshold }(S1) = [ \quad (2)$$
$$\text{Congestion level received from fax feedback handling}$$
$$\text{module 210}] * [\text{Path Length Factor }(PLF)\text{ for }S1]$$

where,

PLF for S1=Average Path Length/Actual Path Length;

Path Length (S1)=Distance between sender side fax device 102 and SSG 106.

Similarly, fax mode determination module 206 in gateway controller 118 obtains values of provisioned congestion level thresholds from fax feedback handling module 210 in gateway controller 118 for the network segments S2 and S3. In an embodiment, the provisioned congestion level thresholds in the network segments S2 and S3 and load level in RSG 114 may be depicted using table 1, given below:

TABLE 1

| Congestion level in S2 | Congestion level in S3 | Load level in receiving side gateway 114 |
|---|---|---|
| L3 level: >85% | L3 level: >86% | L3 level: >87% |
| L2 level: >70%, <=85% | L2 level: >72%, <=86% | L2 level: >68%, <=87% |
| L1 level: >50%, <=70% | L1 level: >51%, <=72% | L1 level: >52%, <=68% |
| L0 level: <=50% | L0 level: <=51% | L0 level: <=52% |

Thereafter, fax mode determination module 206 in gateway controller 118 determines the adapted congestion level thresholds for the network segments S2 and S3. In an embodiment, equation 3 given below may be used to compute adapted congestion level threshold (for example, S2):

$$\text{Adapted congestion level threshold }(S2) = [ \quad (3)$$
$$\text{Congestion level received from fax feedback handling}$$
$$\text{module 210}] * [\text{Path Length Factor }(PLF)\text{ for }S2]$$

where,

PLF for S2=Average Path Length/Actual Path Length;

Path Length (S2)=Distance between SSG 106 and SBC 112.

Additionally, as fax receiving device 104 is an LI target, fax mode determination module 206 in gateway controller 116 also provides thresholds and algorithm to determine fax transmission mode towards LIG 112. In an exemplary embodiment, provisioned congestion level thresholds for the network segment S4 may be depicted as given in table 2.

TABLE 2

| Congestion level in S4 |
|---|
| L3 level: >81% |
| L2 level: >66%, <=81% |
| L1 level: >45%, <=66% |
| L0 level: <=45% |

Using equation similar to equation 2 given above, fax mode determination module 206 in gateway controller 118 determines the adapted congestion level threshold for the network segment S4.

Thereafter, at 604, the adapted congestion level thresholds for the network segments are compared with the existing congestion level in the network segments to compute modified congestion levels in the network segment. For example, adapted congestion level threshold of S2 is compared with the existing congestion level in S2 to compute a modified congestion level for S2. To this end, fax mode determination module 206 in gateway controller 118 determines network congestion levels for the network segments S1, S2 and S3. Additionally, fax mode determination module 206 determines gateway load level for both SSG 106 and RSG 114. In an embodiment, the congestion and load level may be determined on a four-point scale, i.e., Level 0 to Level 3.

For the network segment S3, the modified congestion level is determined by comparing current congestion level in the network segment S3 (obtained from controller resource monitoring module 204 in gateway controller 118) against the adapted threshold level computed for the network segment S3 at 602. Similarly, for the network segment S1, the modified congestion level is determined by comparing current congestion level in the network segment S1 (obtained from controller resource monitoring module 204 in gateway controller 110) against the adapted congestion level threshold computed for the network segment S1 at 602.

However, for the network segment S2, first an average of adapted congestion level threshold received from gateway controller 110 and adapted congestion level threshold received from gateway controller 118 is computed. This average adapted congestion level threshold is then compared with current congestion level in the network segment S2 to compute the modified congestion level for S2.

Further, as receiving side fax device 104 is an LI target, therefore, RSG 114 may be the LI CDE and the connection to LIG 120 may be over User Datagram Protocol (UDP). In this case, fax mode determination module 206 in gateway controller 118 determines modified congestion level for the network segment S4 by comparing the current congestion level value in the network segment S4 against its adapted congestion level threshold.

Thereafter, at 606, an SSG adapted load level is computed for SSG 106 based on comparison of current load level of SSG 106 with associated provisioned load threshold. The information regarding current load level of SSG 106 and associated provisioned load threshold is received from gateway controller 106. At 608, an RSG adapted load level is computed for RSG 114 based on comparison of current load level of RSG 114 with associated provisioned load threshold. The information regarding current load level of SSG 106 and associated provisioned load threshold is received from gateway controller 118.

Based on the modified congestion levels for the network segments S1, S2, S3, and S4 and adapted load level for SSG 106 and RSG 114, a pre-set fax mode selection algorithm is selected from a set of pre-set fax mode selection algorithms at 610. The pre-set fax mode selection algorithm selects the one of the set of pre-set fax modes. In other words, when the pre-set fax mode selection algorithm is executed, it enables selection of the fax mode that is to be used for fax transmission. In an embodiment, fax mode determination module 206 in gateway controller 118 may use table 3 given below to select the pre-set fax mode selection algorithm and thereafter the fax mode to be used for fax transmission.

TABLE 3

| Modified congestion level in S1 | Modified congestion level in S2 | Modified congestion level in S3 | Modified congestion level in S4 | Adapted load level in SSG | Adapted load level in RSG | Algorithms to determine fax mode |
|---|---|---|---|---|---|---|
| L3 level | L3 level | L3 level | L3 level | L3 level | L3 level | Ruleset 1 |
| L3 level | L3 level | L3 level | L3 level | L3 level | L2 level | Ruleset 2 |
| L3 level | L3 level | L3 level | L3 level | L2 level | L3 level | Ruleset 3 |
| L3 level | L3 level | L3 level | L3 level | L2 level | L2 level | Ruleset 4 |
| . . . | | . . . | | | | . . . |
| . . . | | . . . | | | | |
| L2 level | L1 level | L1 level | L0 level | L0 level | L0 level | Ruleset m |
| . . . | | . . . | | | | . . . |
| . . . | | . . . | | | | |
| L0 level | L0 level | L0 level | L0 level | L0 level | L0 level | Ruleset n |

The objective of each algorithm used in table 3 is to ensure that the best possible quality of fax is received based on the existing network conditions. As a result, best quality fax mode is chosen for each of the network segments separately, so that the combined effect will result in receiving best quality fax by fax receiving side fax device 104. Additionally, each of these algorithms ensures that overheads introduced are optimal to achieve the best possible quality of fax. These overheads may include instantaneous overheads (for example, bits/sec sent and additional processing due to transcoding) and overall overheads (for example, total number of additional packets/bits sent). Moreover, these algorithms ensure that LIG 112 always gets the best possible fax quality even if it means that fax receiving device 104 receives a lower fax quality.

In an exemplary embodiment, the ruleset 1 in the algorithms given under table 3 directs using a slower fax mode in order to optimize the additional traffic in an already congested network segment. For example, V.17 is a slower fax mode as compared to V.34. Higher quality traffic modes, for example, T.38, introduce some redundancies, resulting in some overheads while achieving better quality, thus the ruleset 1 offsets this overhead by choosing a slower fax mode wherever possible. In a scenario where there is no possibility of using T.38 or any other robust mode for fax communication, using G.711 (or any other codec) is a last option when there is no possibility of using T.38 or any other robust fax mode for fax communication. In such cases, fax packets are prioritized to minimize loss or corruption due to adverse network conditions in order to improve the fax quality. The fax packets that are sent to LIG 112 may be assigned a higher priority than the fax packets sent to fax receiving device 104, which, in turn, may be assigned a higher priority than other media packets.

After the pre-set fax mode selection algorithm selects the fax mode that is to be used for fax transmission, network conditions and fax quality are continuously diagnosed and accordingly the fax mode is dynamically adapted. To this end, a need to adapt the fax mode is initially determined. In an embodiment, fax mode determination module 206 receives an indication about adverse network conditions from controller resource monitoring module 204 or about change in fax quality from fax quality monitoring module 304. Thereafter, in case the indication was received from controller resource monitoring module 204, fax mode determination module 206 performs a check to determine which fax sessions are impacted due to a change in network conditions. For each session that is impacted, fax mode determination module 206 first determines whether it is possible to change the fax mode. This may be determined based on fax capabilities of sender side fax device 102 and receiver side fax device 104. If it is possible to change the fax mode, fax mode determination module 206 further checks, whether a first predefined time period has lapsed after the last instance of adapting the fax mode. The first predefined time period, for example, may be pre-provisioned as 45 seconds. In case the first predefined time period has not lapsed, fax mode determination module 206 starts a timer T, for: (the first predefined time period—time elapsed since last instance of changing the fax mode). When the timer T expires, fax mode determination module 206 obtains relevant information from controller resource monitoring module 204.

In case, the first predefined time period has elapsed, fax mode determination module 206 checks, based on historical data, if the remaining fax session time for the ongoing fax session is greater than a second predefined time period. The second predefined time period, for example, may be pre-provisioned as 30 seconds. The remaining time for the ongoing fax session may be computed using equation 4 given below:

$$\text{Remaining fax session time} = \text{Average Time of Fax Session (ATFS)} - \text{duration elapsed since start of ongoing fax session.} \quad (4)$$

where,

ATFS is pre-provisioned as five minutes and is adapted over time

If the remaining fax session time is less than the second predefined time period, then monitoring of network conditions and fax quality is continued. However, if the remaining fax session time is greater than the second predefined time period, then the fax mode is adapted for the ongoing session. To this end, fax mode determination module 206 that determined need to adapt the fax mode send all relevant information to fax mode determination module 206 in gateway controller 200 on remote side. For example, fax mode determination module 206 in GWC 110 sends information to fax mode determination module 206 in GWC 118. This relevant information may include, but is not limited to network congestion level in the relevant network segments. When the information is sent by GWC 110, the relevant network segments are S1 and S2. However, when the information is sent by GWC 118, the relevant network segments are S2 and S3. The relevant information further includes load level in SSG 106 or RSG 114, fax capabilities of SSG106 or RSG 114, availability of resources in SSG 106 or RSG 114 to perform transcoding, and current fax quality of an ongoing session. Thus, it is ensured that unnecessary and too frequent adaptation of mode of fax transmission is not carried out in order to avoid adverse side-effects, for example, signaling overheads, and toggling of mode of fax transmission.

After determination of the appropriate fax transmission mode, fax mode determination module 206 informs session management and control module 208, which performs actions required to modify session characteristics. These actions may include, but are not limited to sending relevant information to remote side gateway controller, sender side fax device 102, and receiver side fax device 104 to change fax transmission mode.

Figure 7:
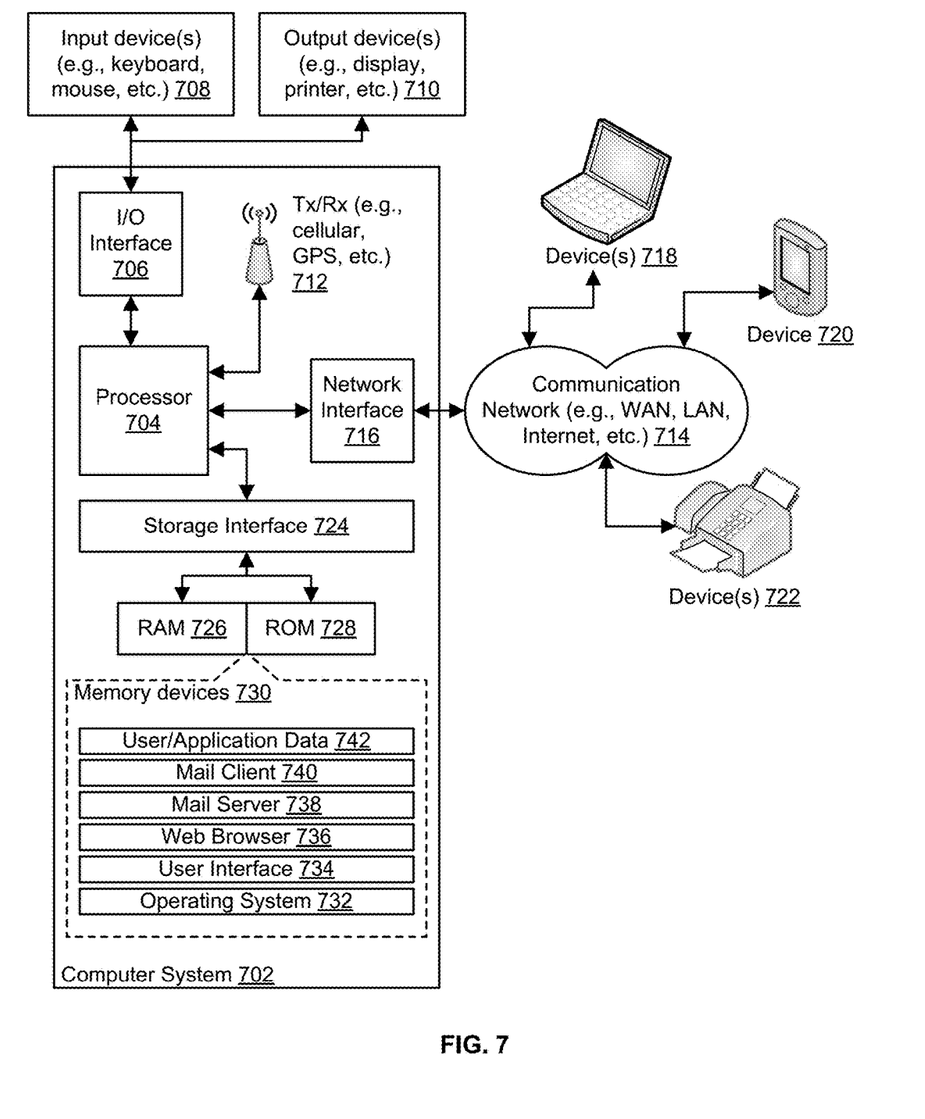
FIG. 7 illustrates a block diagram of an exemplary computer system for implementing various embodiments.

FIG. 7 is a block diagram of an exemplary computer system for implementing various embodiments. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory devices 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 730 may store a collection of program or database components, including, without limitation, an operating system 732, a user interface application 734, a web browser 736, a mail server 738, a mail client 740, a user/application data 742 (e.g., any data variables or data records discussed in this disclosure), etc. Operating system 732 may facilitate resource management and operation of the computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 702 may implement mail server 738 stored program component. Mail server 738 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for increasing quality and reliability of fax communications. In the method, appropriate fax-mode for best quality fax transfer is dynamically selected based on capabilities of the involved parties (for example, sender fax device, receiver fax device, media gateways) and based on dynamic network conditions without causing unnecessary overhead on availability of network resources. Moreover, the gateway controllers monitor network conditions and fax transmission quality in real time to detect any degradation. Based on this, the gateway controller determines if there is need to change the mode of fax transmission and then dynamically changes to appropriate mode of fax transmission. Additionally, gateway controller, while determining the appropriate mode of fax transmission, takes into account transmission bandwidth and processing resources of the gateways. As a result, the network resource usage is optimized for the selected mode of fax transmission while maintaining the desired fax quality. Additionally, it is ensured that unnecessary and too frequent adaptation of mode of fax transmission is not carried out in order to avoid adverse side-effects, for example, signaling overheads, and toggling of mode of fax transmission. Finally, the system adapts over time based on past experience, thereby, improving its accuracy by auto-tuning.

The specification has described methods and systems for increasing quality and reliability of fax communications. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of communicating fax in a communication network, the method comprising:

diagnosing in real-time, by at least one network device, network parameters, availability of network resources, and technical capabilities of network devices involved in communicating fax, wherein the diagnosing comprises detecting existing congestion level in network segments required for transmitting and receiving fax, a current Sender Side Gateway (SSG) load level for a SSG, and a current Receiver Side Gateway (RSG) load level for a RSG;

modifying dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication, and wherein the modifying comprises adapting a provisioned congestion level threshold for network segments in response to the detection to generate adapted congestion level thresholds, an adapted congestion level threshold for a network segment computed based on associated provisioned congestion level threshold, average distance between the network devices at start and end of the network segments, and actual distance between the network devices at start and end of the network segments: and iteratively adapting, by the at least one network device, dynamic modification of the fax mode, based on historic fax mode modification and historic diagnosis data.

2. The method of claim 1 further comprising provisioning:
a plurality of thresholds, each threshold being associated with one of the network parameters and fax quality; and
network topology related information.

3. The method of claim 2, wherein a threshold associated with fax quality is selected from a group comprising number of fax packets missing per second, number of fax packets dropped per second, and number of fax packets corrupted per second.

4. The method of claim 1, wherein diagnosing further comprises:
determining fax transmission capability of a sender side fax device and fax reception capability of a receiver side fax device;
determining fax transmission capability of the SSG and fax reception capability of the RSG involved in communication of fax;
determining, based on historical data, characteristics associated with preceding instance of adapting the fax mode to one of a set of pre-set fax modes; and
determining resource availability for performing fax transcoding at the SSG and the RSG.

5. The method of claim 1, wherein modifying comprises comparing the adapted congestion level thresholds for the network segment with the existing congestion level in the network segment to compute modified congestion level in the network segment.

6. The method of claim 5, wherein modifying further comprises:
computing an SSG adapted load level for the SSG based on comparison of the current SSG load level with associated provisioned threshold; and
computing an RSG adapted load level for the RSG based on comparison of the current RSG load level with associated provisioned threshold.

7. The method of claim 6, wherein modifying further comprising selecting a pre-set fax mode selection algorithm from a set of pre-set fax mode selection algorithms based on modified congestion levels for the network segments, the SSG adapted load level, and the RSG adapted load level.

8. The method of claim 7, wherein the pre-set fax mode selection algorithm selects the one of the set of pre-set fax modes.

9. The method of claim 1, wherein the network parameters are selected from a group comprising network congestion, network choke, packet queueing, buffer overflows, network delays, packet drops, erroneous packets, users involved in session for fax communication, and interception by a Lawful Interception Gateway (LIG).

10. A system for communicating fax in a communication network, the system comprising: at least one processors; and a computer-readable medium storing instructions that, when executed by the at least one processor, cause the at least one processor to perform operations comprising:
diagnosing in real-time, by at least one network device, network parameters, availability of network resources, and technical capabilities of network devices involved in communicating fax, wherein the diagnosing comprises detecting existing congestion level in network segments required for transmitting and receiving fax, a current Sender Side Gateway (SSG) load level for a SSG, and a current Receiver Side Gateway (RSG) load level for a RSG;
modifying dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication, and wherein the modifying comprises adapting a provisioned congestion level threshold for network segments in response to the detection to generate adapted congestion level thresholds, an adapted congestion level threshold for a network segment computed based on associated provisioned congestion level threshold, average distance between the network devices at start and end of the network segments, and actual distance between the network devices at start and end of the network segments; and
iteratively adapting, by the at least one network device, dynamic modification of the fax mode, based on historic fax mode modification and historic diagnosis data.

11. The system of claim 10, wherein the operations further comprise provisioning:
a plurality of thresholds, each threshold being associated with one of the network parameters and fax quality; and
network topology related information.

12. The system of claim 11, wherein a threshold associated with fax quality is selected from a group comprising number of fax packets missing per second, number of fax packets dropped per second, and number of fax packets corrupted per second.

13. The system of claim 10, wherein the operation of diagnosing further comprises operation of:
determining fax transmission capability of a sender side fax device and fax reception capability of a receiver side fax device;
determining fax transmission capability of the SSG and fax reception capability of the RSG involved in communication of fax;
determining, based on historical data, characteristics associated with preceding instance of adapting the fax mode to one of a set of pre-set fax modes; and
determining resource availability for performing fax transcoding at the SSG and the RSG.

14. The system of claim 10, wherein the operation of modifying further comprises operation of comparing the adapted congestion level thresholds for the network segment with the existing congestion level in the network segment to compute modified congestion level in the network segment.

15. The system of claim 14, wherein the operation of modifying further comprises operation of:
computing an SSG adapted load level for the SSG based on comparison of the current SSG load level with associated provisioned threshold; and
computing an RSG adapted load level for the RSG based on comparison of the current RSG load level with associated provisioned threshold.

16. The system of claim 15, wherein the operation of modifying further comprises operation of selecting a pre-set fax mode selection algorithm from a set of pre-set fax mode selection algorithms based on modified congestion levels for the network segments, the SSG adapted load level, and the RSG adapted load level.

17. The system of claim 16, wherein the pre-set fax mode selection algorithm selects the one of the set of pre-set fax modes.

18. A non-transitory computer-readable storage medium for communicating fax in a communication network, when executed by a computing device, cause the computing device to:
- diagnose in real-time, by at least one network device, network parameters, availability of network resources, and technical capabilities of network devices involved in communicating fax, wherein the diagnose comprises detecting existing congestion level in network segments required for transmitting and receiving fax, a current Sender Side Gateway (SSG) load level for a SSG, and a current Receiver Side Gateway (RSG) load level for a RSG;
- modify dynamically, by the at least one network device, a fax mode to one of a set of pre-set fax modes based on result of the diagnosing the network parameters, availability of the network resources, and the technical capabilities of the network devices, wherein each of the set of pre-set fax modes corresponds to a quality of fax communication, and wherein the modifying comprises adapting a provisioned congestion level threshold for network segments in response to the detection to generate adapted congestion level thresholds, an adapted congestion level threshold for a network segment computed based on associated provisioned congestion level threshold, average distance between the network devices at start and end of the network segments, and actual distance between the network devices at start and end of the network segments; and
- iteratively adapt, by the at least one network device, dynamic modification of the fax mode, based on historic fax mode modification and historic diagnosis data.

* * * * *